Figure 1:
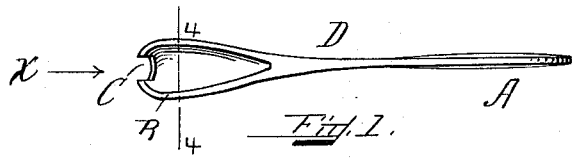

No. 687,135. Patented Nov. 19, 1901.
G. S. DOLLOFF.
COLLAR BUTTONING DEVICE.
(Application filed Apr. 1, 1901.)
(No Model.)

Witnesses:
Inventor:
George S. Dolloff.

UNITED STATES PATENT OFFICE.

GEORGE S. DOLLOFF, OF NEEDHAM, MASSACHUSETTS.

COLLAR-BUTTONING DEVICE.

SPECIFICATION forming part of Letters Patent No. 687,135, dated November 19, 1901.

Application filed April 1, 1901. Serial No. 53,770. (No model.)

*To all whom it may concern:*

Be it known that I, GEORGE S. DOLLOFF, a citizen of the United States, residing at Needham, in the county of Norfolk and State of Massachusetts, have invented new and useful Improvements in Collar-Buttoning Devices, of which the following is a specification.

This invention relates to an improved device for buttoning a collar onto the collar-button on the neckband of a shirt, and for such purpose I use a device as shown in the drawings, wherein—

Figures 2, 3, 4:
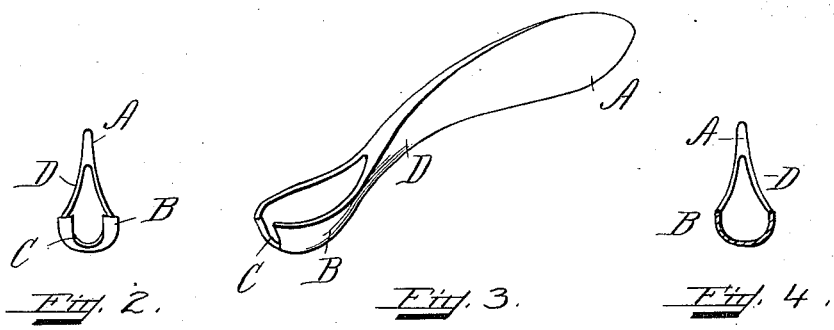
Figure 5:
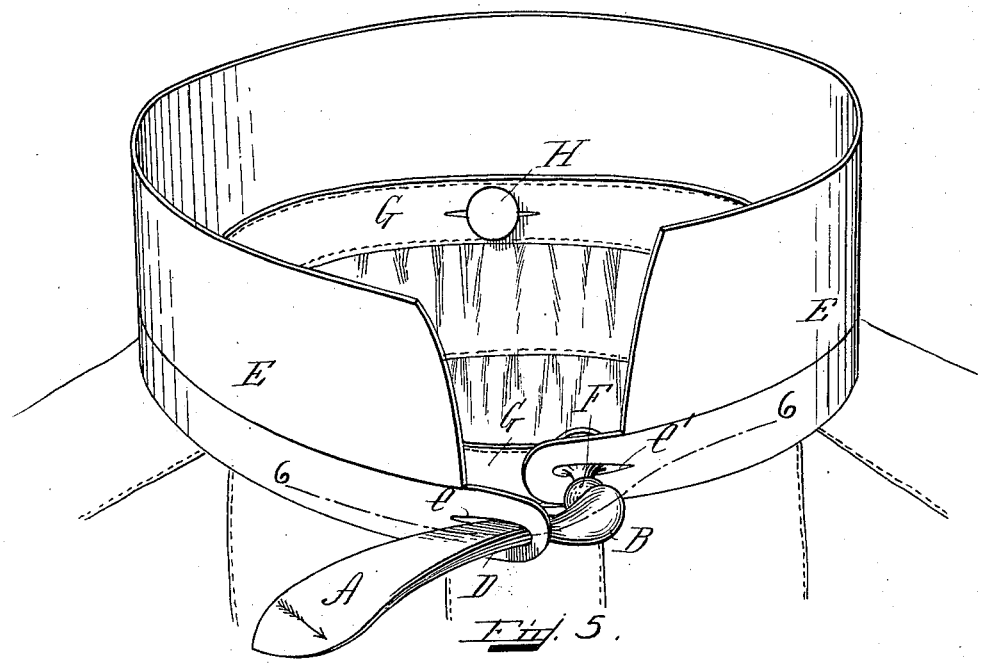
Figure 6:
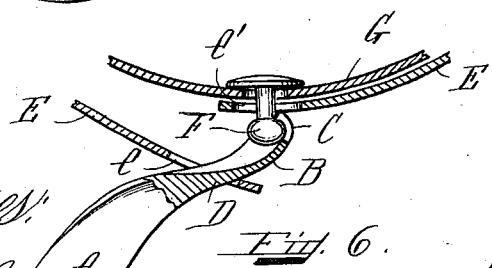

Figure 1 represents a top plan view of the collar-buttoning device. Fig. 2 represents an end view thereof as seen from X in Fig. 1. Fig. 3 represents a perspective view of the invention. Fig. 4 represents a cross-section on the line 4 4 shown in Fig. 1. Fig. 5 represents a perspective view of the device, showing it in position during the act of buttoning the collar to the stud or button connected to the neckband of the shirt; and Fig. 6 represents a horizontal section on the line 6 6 shown in Fig. 5.

Similar letters refer to similar parts wherever they occur on the different parts of the drawings.

My improved collar-buttoning device consists of a flattened shank A, terminating at its opposite end as a spoon-shaped stud-engaging portion B, provided at its end with a semicircular, or nearly so, cut-away portion or notch C, adapted to fit around the shank of the collar-button during the buttoning operation.

The flattened shank A is made wedge-shaped intermediate between its outer end and the spoon-shaped portion B, as shown at D in the drawings. Such wedge-shaped portion is made for the purpose of expanding the buttonhole *e* in the collar E previous to buttoning it on the stud or collar-button F, as represented in Figs. 5 and 6.

G in Figs. 5 and 6 represents the neckband of the shirt, to which the rear portion of the collar E is connected by means of a button or fastener H, as usual.

The first buttonhole *e'* of the collar is usually quite readily attached to the stud or collar-button F; but when the collar is starched stiff it is often quite difficult to button the second buttonhole *e* onto the said stud or collar-button F, and to facilitate this latter operation is the object of my invention, and for such purpose I introduce the flat or thin shank A of the tool through the buttonhole *e* from the inside of the collar E, as shown in Figs. 5 and 6, and in so doing the wedge-shaped portion D of said tool causes the edges of the buttonhole *e* to be properly expanded, so as to facilitate the buttoning operation. I then place the spoon-shaped end B of said tool onto the head and around the shank of the collar-button F, as shown in said Figs. 5 and 6, and swing the shank A in the direction of the arrow shown upon it in said Figs. 5 and 6, using the collar-button F as a fulcrum until the latter is caused to enter the collar-buttonhole *e*, when the tool may readily be detached simply by moving it forward from the now buttoned collar.

The device is very simple and is particularly well adapted for the purpose above mentioned, although it may similarly be used for the purpose of buttoning gloves, other portions of garments, or boots and shoes.

Having thus fully described the nature, construction, and operation of my invention, I wish to secure by Letters Patent and claim—

A collar-buttoning device consisting of a strip of suitable material having a narrow flattened shank for opening a buttonhole, said shank terminating in a wedge-shaped portion gradually increasing in thickness for expanding the hole and the said wedge-shaped portion having its flattened end terminating in a spoon-shaped portion lying in a plane at right angles to the shank and provided with a notch, said spoon-shaped portion and notch adapted to engage, respectively, the head and shank of the button.

In testimony whereof I have hereunto set my hand in presence of two subscribing witnesses.

GEORGE S. DOLLOFF.

Witnesses:
ALBAN ANDRÉN,
FRANCIS A. PERRY.